United States Patent [19]

Campisi et al.

[11] Patent Number: 4,704,517

[45] Date of Patent: Nov. 3, 1987

[54] AUTOMATIC STORAGE AND RETRIEVAL SYSTEM AND METHOD

[75] Inventors: Carl Campisi; David C. Kilinskis; Egil Sorlie, all of Chicago

[73] Assignee: Zenith Electronics Corporation, Glenview, Ill.

[21] Appl. No.: 789,232

[22] Filed: Oct. 18, 1985

[51] Int. Cl.⁴ .............................................. G06K 5/00
[52] U.S. Cl. .................................... 235/382; 235/375
[58] Field of Search ................................ 23/382, 375

[56] References Cited

U.S. PATENT DOCUMENTS 3,800,284  3/1974  Zucker ................................. 235/382

Primary Examiner—Harold I. Pitts

[57] ABSTRACT

A system and method for automatically storing bar coded elements such as containers for electronic components in storage bins such as drawers in a cabinet and for providing access to only the drawer containing a desired element substantially eliminates human error and increases reliability in the handling and processing of these elements and reduces the cost of inventory management and control. The storage and retrieval system includes a bar code reader coupled to a controller which, in turn, is coupled to a plurality of storage cabinets. Each storage cabinet includes a plurality of drawers each coupled to the controller via the combination of an electrical interface and a mechanical drive. Reading of the bar code on an element or on an apparatus into which the elements are deposited for processing or installation into the controller automatically opens a drawer associated with that particular component. Following either deposit of the coded element into the drawer or its removal therefrom, the drawer is manually closed by an operator and remains locked to prevent unauthorized or erroneous access to the contents of the drawer until that code is again read into the controller. Access to a given drawer is prevented so long as any other drawer is open and only that drawer associated with a given coded element is open following reading of the bar code thereon in eliminating the possibility of element handling errors.

20 Claims, 5 Drawing Figures

AUTOMATIC STORAGE AND RETRIEVAL SYSTEM AND METHOD

BACKGROUND OF THE INVENTION

This invention relates generally to the handling of stored elements or goods and is particularly directed to the automatic storage and retrieval of elements positioned within a secured bin or drawer.

Inventory control and management is an important part of any organization involved in the manufacture, distribution, or sale of goods. It is important not only to know the number and types of items in stock, but also to ensure that these items are located in an assigned place from which they may be easily retrieved. Since in most environments the items are at some point handled by a worker, it is desirable to minimize the possibility of human error in the categorizing, storing and retrieval of these items. This is critically important where the items are substantially identical in appearance but are substantially dissimilar and possibly even unrelated in operation and function.

One environment where this situation frequently occurs is in the handling of electronic components used in the fabrication of electrical circuits and apparatus where several categories of electronic components may be substantially identical in appearance. Frequently these components are provided with unique identification markings, but these indicia are typically difficult to see much less identify particularly when positioned upon a small object such as the typical electronic component. The intermixing of electronic components of various types or of various electronic components of the same type having a range of operating characteristics or parameters frequently results in inaccurate and unreliable circuit fabrication or may even preclude circuit fabrication unless complicated component handling procedures are strictly followed. The problem becomes even more severe where marginally trained workers handle very large numbers of components such as in the large scale manufacture of consumer-type electronic products.

The present invention is intended to provide a solution to the aforementioned problems in the storage and retrieval of stock items such as electronic components wherein the possibility of human error in the handling of these items is essentially eliminated by the automatic, computer controlled accessing of only that storage container or bin uniquely assigned to or associated with a given item.

OBJECTS OF THE INVENTION

Accordingly, it is an object of the present invention to provide for improved handling of stored goods.

It is another object of the present invention to provide for the automatic storage and retrieval of goods in inventory by means of an arrangement and a method which substantially eliminate the possibility of errors in the handling of these goods.

Yet another object of the present invention is to provide for the automatic storage in and retrieval from looked drawers of bar coded elements.

A further object of the present invention is to provide a computer controlled inventory information and control system.

A still further object of the present invention is to provide for improved reliability in the handling of coded bulk containers wherein are stored large numbers of electronic components by substantially reducing the possibility of human error in their storage and retrieval.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE PREFERRED EMBODIMENT

Figure 1:
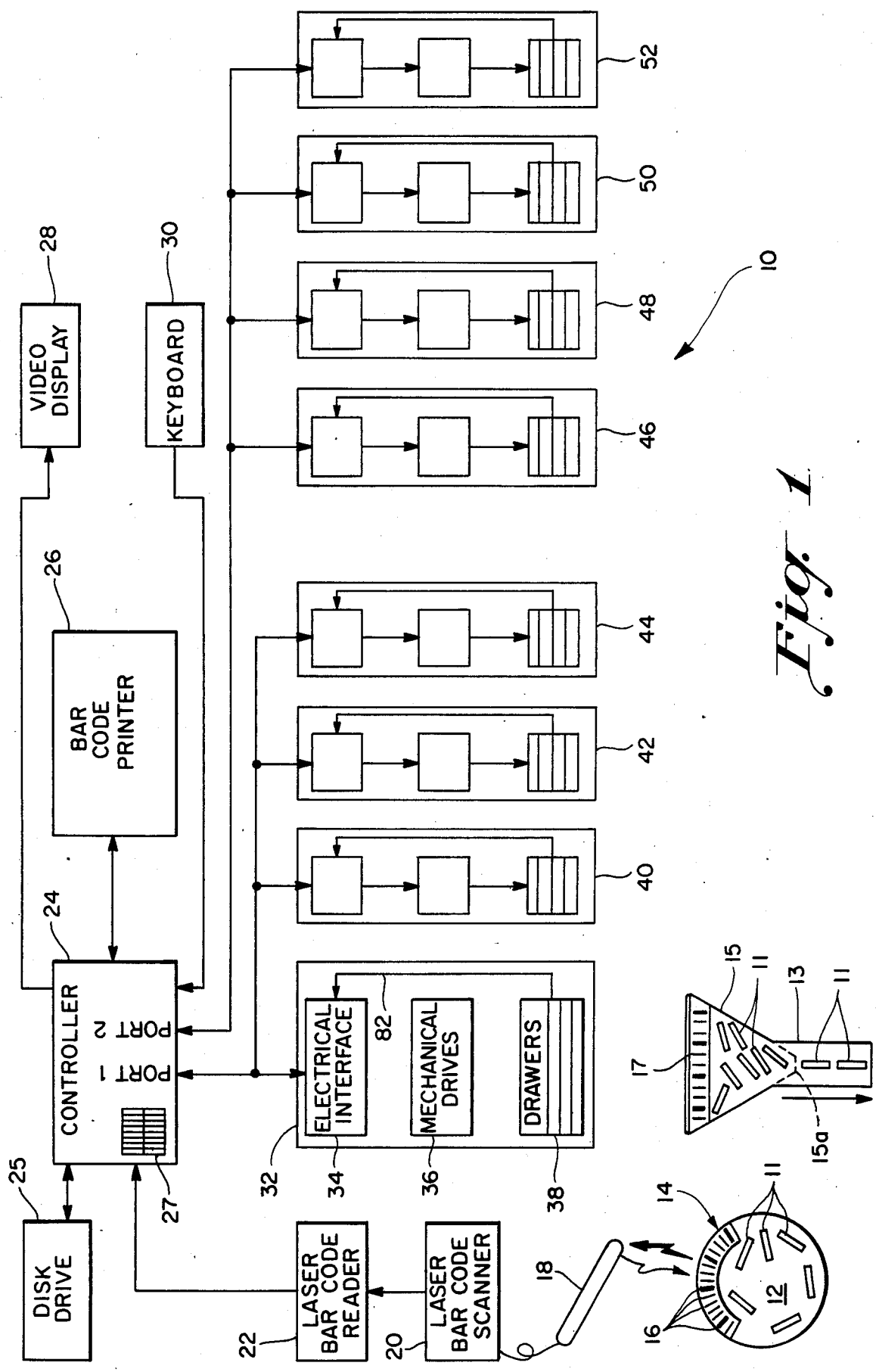
FIG. 1 is a simplified schematic and block diagram of an automatic storage and retrieval system in accordance with the present invention.

Referring to FIG. 1, there is shown a simplified schematic and block diagram of a storage and retrieval system 10 in accordance with the present invention.

The storage and retrieval system 10 operates in combination with a container 12 having a bar code 14 on an outer portion thereof. The container 12 may be virtually of any type such as a bag, a box, a can, or a basket. Positioned within the container 12 are a plurality of items 11 which are stored and retrieved in an organized manner as described in detail below. In one implementation of the present invention, a plurality of electronic components 11 of the same type are stored in a bag 12 for handling in accordance with the present invention.

The bar code 14 on an outer portion of the bag 12 is conventional in nature and is comprised of a plurality of aligned, parallel, elongated strips of various widths with various sized spacings interposed therebetween. The widths of these strips, or bars, as well as the inter-bar spacings form a code which uniquely identifies the bag 12 to which it is attached. A scanning beam transmitter/receiver 18, commonly termed a wand, is coupled to a laser bar code scanner 20 and directs a laser beam onto the bar code 14 of the bag 12. The laser beam is reflected from the bar code 14 back to the scanning beam transmitter/receiver 18 in accordance with the arrangement of coded lines 16 in the bar code and provides information to the laser bar code scanner 20 which uniquely identifies the bag 12. The bar code scanner 20 provides the received coded signals to a laser bar code reader 22 which, in turn, is coupled to and provides the coded digital data to a controller 24. The controller 24 is, in turn, coupled to a bar code printer 26 and to a video display 28 as well as a keyboard 30. The video display 28 provides a system operator with a visual indication of various system operating parameters such as the bar code 14 read from the bag 12, the number of elements or components remaining in the storage and retrieval system, the location of various components within the system, and various other inventory-type bookkeeping functions. The controller 24 is also coupled to a keyboard 30 which permits the operator to enter operating data such as in generating new bar codes by means of the bar code printer 26 or in requesting the presentation of system status information on the video display 28.

In a preferred embodiment, the controller 24 is a Z-100 computer available from Zenith Data Systems and is in the form of a terminal having integrated therewith the video display 28 and the keyboard 30. Similarly, an Intermec Model 1600 laser bar code scanner, an Intermec Model 9500 laser bar code reader, and an Intermec Model 8620 bar code printer are used in a preferred embodiment of the present invention.

The controller 24 includes a plurality of input/output (I/O) ports for coupling the controller by means of bi-directional data lines to a plurality of cabinets. The controller 24 further includes a disk drive system 25 within which is stored an operating program for controlling the operation of the storage and retrieval system 10. The operating program is loaded into the random access memory (RAM) 27 from the disk drives 25 before the operating program is executed from the RAM 27. The controller 24 also includes a random access memory (RAM) 27 for storing the bar codes associated with each container 12 as well as various other operating parameters such as the number and type of each component in each drawer, the number of cabinets in use, the number of drawers in each cabinet, etc. The bar codes and operating parameters are also stored on disk so that they will be available if the power ever becomes interrupted. As shown in FIG. 1, cabinets 32, 40, 42 and 44 are coupled to port 1 of the controller 24, while cabinets 46, 48, 50 and 52 are coupled to port 2 of the controller. Each of the cabinets, as shown specifically for cabinet 32 in FIG. 1, includes an electrical interface 34, a plurality of mechanical drives 36, and a plurality of drawers 38. The electrical interface 34 provides appropriate electrical coupling between the controller 24 and each of the mechanical drives 36. Each of the mechanical drives 36 is responsive to an appropriate control signal received from the electrical interface 34 and is coupled to a respective drawer for controlling the operation thereof as described below.

Also in accordance with the present invention, a bar code 17 is positioned upon a hopper 15 which is removably coupled to a component feeder 13. Following retrieval of a component bag 12 from one of the drawers 38 as described in detail below, the electronic components are deposited in the appropriate hopper 15 in accordance with the bar code 17 thereon. The lower portion of the hopper 15 is provided with an aperture 15a therein which allows the electronic components to fall under the influence of gravity into a component feeder 13. The component feeder 13 orients and positions the electronic components 11 for engagement and positioning in an electrical circuit such as upon a circuit board (not shown) in a conventional manner.

Figure 2:
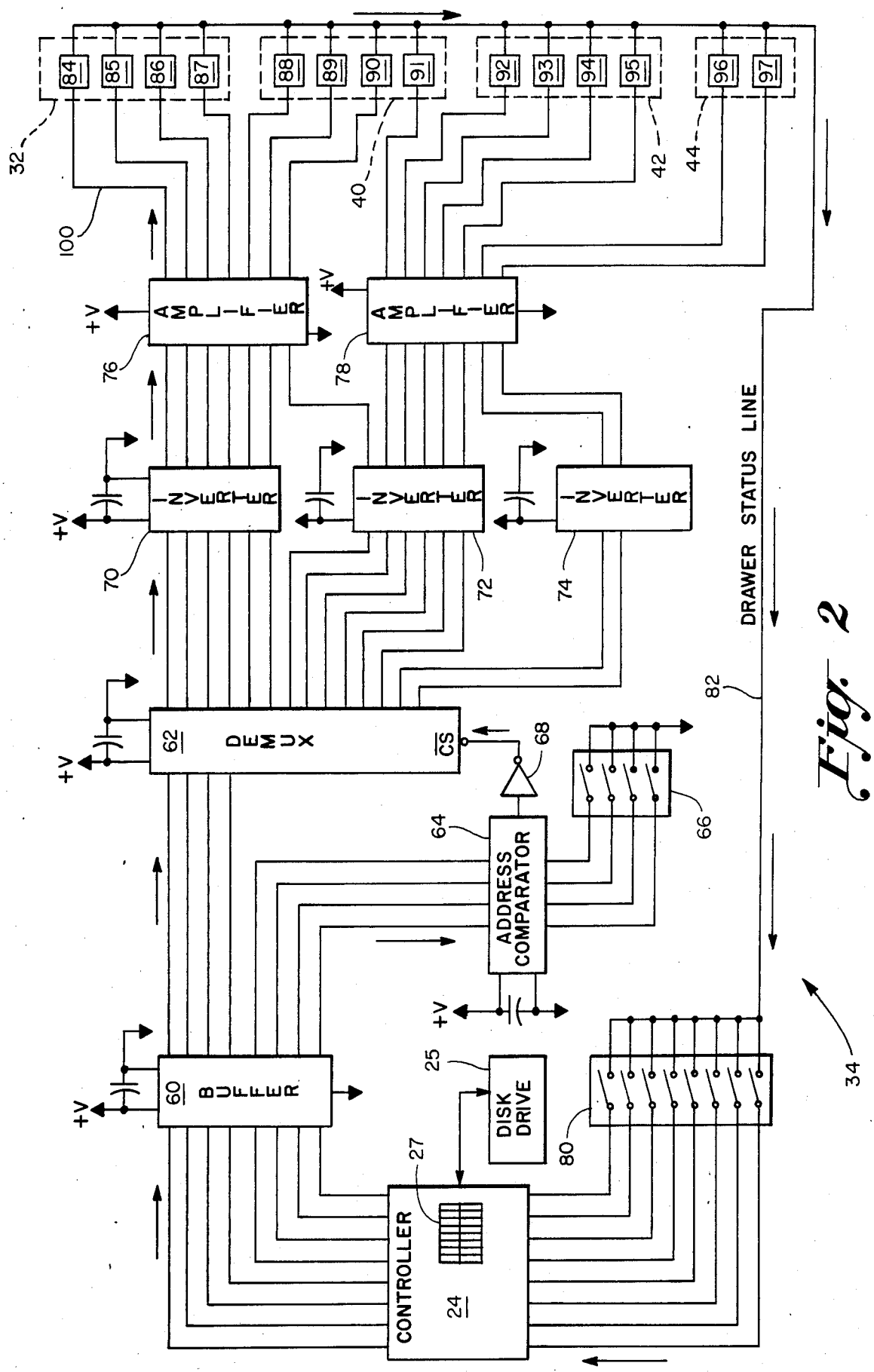
FIG. 2 is a combined schematic and block diagram of an electrical interface arrangement for coupling a controller to a plurality of drawers in several cabinets for use in the automatic storage and retrieval system of FIG. 1.

Referring to FIG. 2, there is shown a simplified combined schematic and block diagram of an electrical interface 34 for coupling the controller 24 to the mechanical drives 36 associated with each of a plurality of drawers 38 in the cabinet 32. The controller 24 is coupled by means of 8 output lines for providing 8 bit coded words to a buffer circuit 60. The buffer circuit 60 appropriately conditions the output signals from the controller 24 for providing four of the coded bits to a demultiplexer (DEMUX) 62. The demultiplexer 62 converts the four coded bits from the buffer circuit 60 to a 16 bit coded word provided via sixteen lines to three inverters 70, 72 and 74. The four bits provided from the buffer 60 to the demultiplexer 62 represent a drawer code provided to the controller 24 either via the keyboard 30 by an operator or via the aforementioned arrangement of the scanning beam transmitter/receiver 18, the laser bar code scanner 20, and the laser bar code reader 22. The remaining four output lines from the buffer 60 are provided to an address comparator 64 and represent a code which uniquely identifies one of the cabinets within which the drawer which it is desired to access is located.

The inverters 70, 72 and 74 invert the coded outputs from the demultiplexer 62 to positive logic and provide these binary signals to a pair of current amplifiers 76 and 78. Each of the current amplifiers 76, 78 is comprised of an array of transistors (not shown) for driving a respective relay (shown in FIG. 3) coupled to each of the drawers 84 through 97. As shown in FIG. 2, each output line from one of the current amplifiers 76, 78 is coupled to and actuates a respective drawer for opening the drawer as described in detail below.

In addition to the 4 bit coded cabinet address provided from the buffer circuit 60 to the address comparator 64, a preset address comprised of 4 bits is also provided from a four-element dip switch 66 to the address comparator. Upon closure of one of the switch elements within the dip switch 66, an associated input to the address comparator is pulled low and a manually set coded address input may be provided from the dip switch 66 to the address comparator 64. The address comparator 64 thus compares a manually preset cabinet address with a cabinet address received from the controller 24 and provides an output via inverter 68 to the Chip Select ($\overline{CS}$) input pin of the demultiplexer 62 when these two cabinet addresses match. Thus, when the manually preset address provided by the dip switch 66 matches the received cabinet address provided by the controller 24 to the address comparator 64, the demultiplexer 62 provides the 4-to-16 converted drawer addresses to the three inverters 70, 72 and 74.

Each of the drawers 84 through 97 is coupled to a status line 82 for providing an indication as to whether a drawer is open or closed. The status line 82 is coupled via an eight element dip switch 80 to the controller 24 for providing drawer status information thereto. Since each of the drawers 84 through 97 is coupled in series to the status line 82, if any of the aforementioned drawers is open, an appropriate signal will be provided via the dip switch 80 to the controller 24. The controller 24 prevents the opening of another drawer while the first drawer remains open. Thus, a drawer may be automatically opened in response to a bar code input provided to the laser bar code scanner 20 only if all other drawers are closed. This prevents the inadvertent deposit or removal of a component bag from an improper drawer. In a preferred embodiment, eight cabinets are used in the storage and retrieval system of the present invention. Thus, the dip switch 80 is provided with eight individual switch elements to provide a manual selection capability in determining in which cabinet there is an open drawer. For example, receipt of a return signal by the controller 24 via the drawer status line 82 with the upper, or first, switch element closed, indicates that a drawer in the first cabinet is open. The inclusion of the manually selectable dip switch 80 in the drawer status signal return line 82 facilitates locating an open drawer in the storage and retrieval system.

Figure 3:
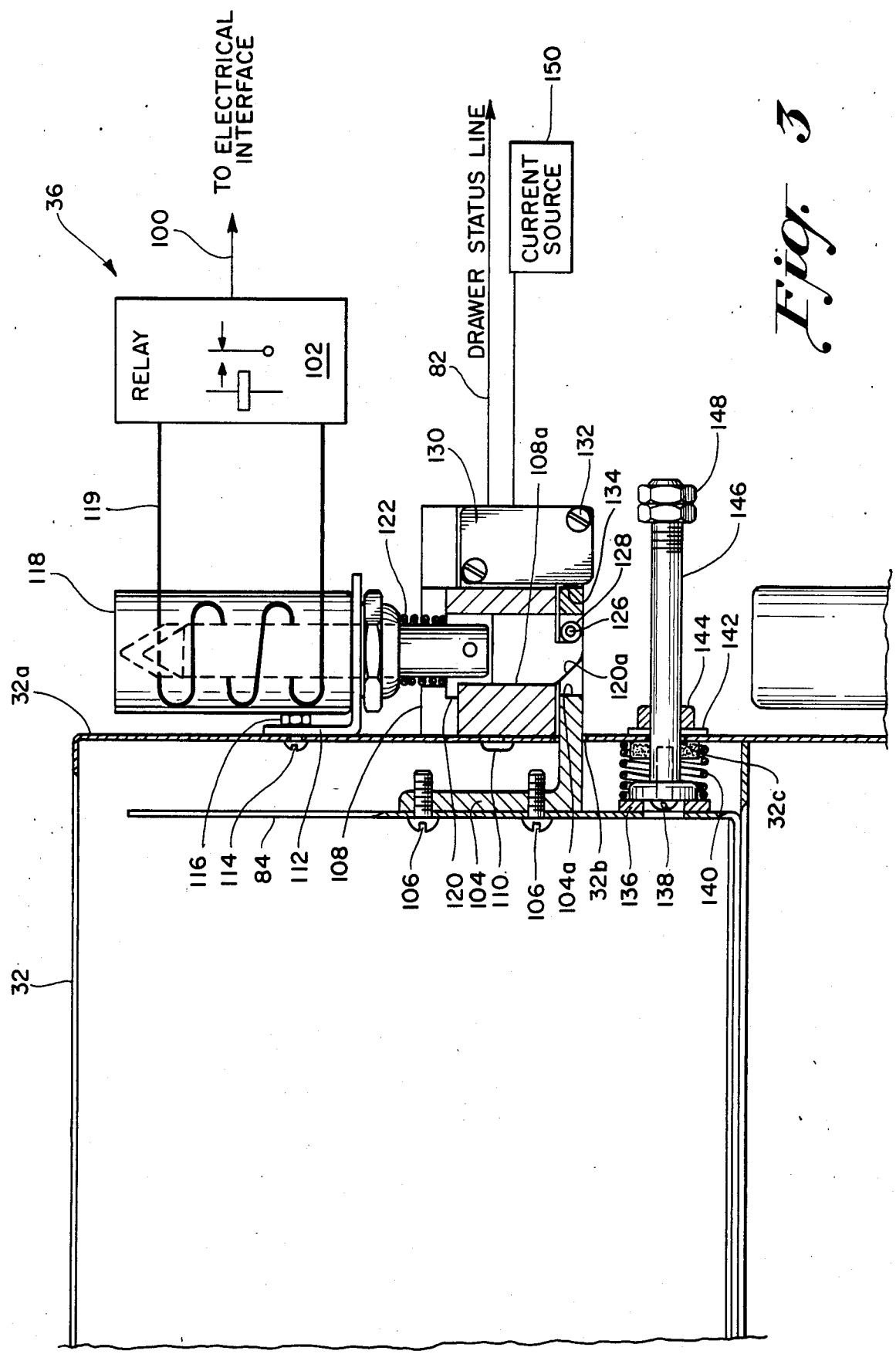
FIG. 3 is a simplified schematic diagram of a mechanical drive arrangement for controlling the position of a drawer in the automatic storage and retrieval system of the present invention.

Referring to FIG. 3, there is shown a simplified schematic diagram of a mechanical drive 36 for automatically latching and unlatching a drawer 84 positioned within the cabinet 32. The mechanical drive assembly 36 includes a relay 102 coupled to the electrical interface 32 via a drawer actuation line 100. In response to a release signal provided from the electrical interface via the drawer actuation line 100 to the relay 102, a solenoid 118 is actuated to release or unlock the drawer 84 permitting it to automatically open so as to project from the cabinet 32 to permit an item to be either deposited in or removed from the drawer. The automatic unlatching feature of the storage and retrieval system of the present invention is provided in the following manner.

The mechanical drive assembly 36 includes a generally L-shaped latch 104 positioned on an aft, outer surface of the drawer 84 and maintained thereon by means of a plurality of mounting screws 106. The latch 104 includes an aperture 104a in a distal portion thereof. The aft panel 32a of the cabinet 32 includes a first aperture 32b therein through which the distal portion of the latch 104 extends when the drawer is in the closed position as shown in FIG. 3.

Mounted to the aft panel 32a of the cabinet 32 by means of the combination of a mounting screw 114 and a nut 116 is an L-shaped bracket 112 which includes an aperture in the generally horizontally oriented portion thereof. Positioned within this aperture and supported by the L-shaped bracket 112 is a solenoid 118. The solenoid 118 is coupled to the relay 102 by means of a conductor 119 and is actuated by current flow therethrough. A plunger 120 within the solenoid 118 is displaced upward or downward as shown in dotted line form in the figure in accordance with the direction of current flow within the conductor 119.

Positioned beneath the L-shaped bracket 112 and also coupled to the aft panel 32a of the cabinet 32 by means of a plurality of mounting screws 110 is a lower bracket 108. The lower bracket 108 includes a generally vertically aligned channel 108a therein within which is positioned the plunger 120 of the solenoid 118. The plunger 120 is free to move upward and downward within the channel 108a of the lower bracket 108 in response to actuation of the solenoid 118 by the current within the conductor 119. When in the fully lowered position as shown in FIG. 3, the lower end portion of the plunger 120 is positioned within the aperture 104a in the distal portion of the latch 104. With the plunger 120 thus positioned within the aperture 104a in the latch 104, the drawer 84 is latched in the closed position and cannot be opened. Following receipt of a drawer open signal from the electrical interface via the combination of the drawer actuation line 100, the relay 102, and the conductor 119, the plunger 120 in the solenoid 118 is displaced upward such that the plunger is no longer positioned within the aperture 104a in the latch 104. The drawer 84 is then laterally displaced within the cabinet 32 to an open position. The plunger 120 is biased downward by a coil spring 122 positioned between a lower end portion of the solenoid body and an intermediate portion of the plunger so as to maintain the plunger within the aperture 104a in the latch 104 in maintaining the drawer in a locked configuration. A lower portion of the plunger 120 is provided with a beveled edge 120a which is engaged by the distal end of the latch 104 when the drawer 84 is closed for urging the plunger upward to permit the drawer to be locked. A lateral portion of the latch 104 is provided with the combination of a mounting pin 126 and a roller 128 to facilitate relative displacement between the latch and the lower bracket 108 and to maintain alignment between these components of the mechanical drive assembly 36. The roller 128 engages a lower portion of the lower bracket 108 and is rotationally displaced in response to lateral displacement of the drawer 84 to facilitate the opening and closing thereof.

The aft panel 32a of the cabinet 32 is further provided with a lower aperture 32c within which is positioned a bushing 144. The bushing 144 is maintained in position on the aft panel 32a of the cabinet 32 by means of a ring 142 positioned therearound. The bushing 144 also includes an aperture therein within which is positioned an elongated, cylindrical push rod 146. A proximal end of the push rod 146 is coupled to an aft portion of the drawer 84 by means of the combination of a flange washer 136 and a coupling screw 138. A distal end portion of the push rod 146 is provided with a pair of nuts 148 threadably mounted thereon. A coiled ejection spring 140 is positioned between the flange washer 136 on the aft portion of the drawer 84 and the inner surface of the aft panel 32a of the cabinet 32. Following release of the latch 104 from the combination of the solenoid 118 and the lower bracket 108 upon removal of the plunger 120 from the aperture 104a in the latch, the ejection spring 140 urges the drawer 84 in a leftward direction to an open position. The nuts 148 positioned on the distal end portion of the push rod 146 limit the leftward displacement of the drawer to an open position by engaging the bushing 144. In closing the drawer 84, the drawer is displaced rightward resulting in the compression of the ejection spring 140 and the displacement of the push rod 146 along the bushing 144 so as to extend outward from the aft panel 32a of the cabinet 32. The distal end of the latch 104 engages the beveled edge 120a of the plunger 120 urging it upward. Further displacement of the combination of the drawer 84 and the latch 104 mounted thereto results in the vertical alignment of the respective apertures 104a and 108a in the latch 104 and the lower bracker 108 permitting the plunger 120 to be displaced downward within the aperture of the latch under the influence of the plunger return spring 122. The drawer is thus securely locked in the closed position.

Mounted to an aft portion of the lower bracket 108 by means of a plurality of mounting screws 132 is a microswitch 130. The microswitch 130 includes a contact 134 which is positioned and adapted for engagement by the distal end of the latch 104 upon closure of the drawer 84. The microswitch 130 is coupled to a current source 150. Upon closure of the drawer 84 and engagement of the latch 104 with the contact 134 of the microswitch 130, a signal is provided via the microswitch to the drawer status line 82. As shown in FIG. 2 and as discussed above, the drawer status line 82 is coupled to the controller 24 via the dip switch 80. Each drawer 84 is coupled to the controller 24 via the drawer status line 82 by means of which an indication is provided to the controller that a drawer is open. In response to the receipt of a signal indicating that a drawer is open, the microcomputer 24 is inhibited from providing an open signal as described above to another drawer. In this manner, the simultaneous opening of two drawers is prevented and the deposit of an improper container into a given drawer or the removal of a container from an unintended drawer is avoided.

The manner in which the storage and retrieval system 10 of the present invention controls the handling of the component containers 12 will now be described with reference to the flow charts shown in FIGS. 4 and 5 as well as to the previously described system components. This flow chart depicts the programming of the controller 24 in a general way and does not include reference to the common, standard routines executed in a typical microcomputer such as internal data transfer and housekeeping functions. In reference to FIGS. 4 and 5 an oval symbol indicates the start or completion of an operational sequence, a diamond indicates a decision point, and a rectangle indicates the performance of an operation. The details of the entire program for a Z-100 microcomputer used as the controller in a preferred embodiment of the present invention are set forth in Table I which is a listing of the operating program stored in the controller's disk drive 25.

Figure 4:
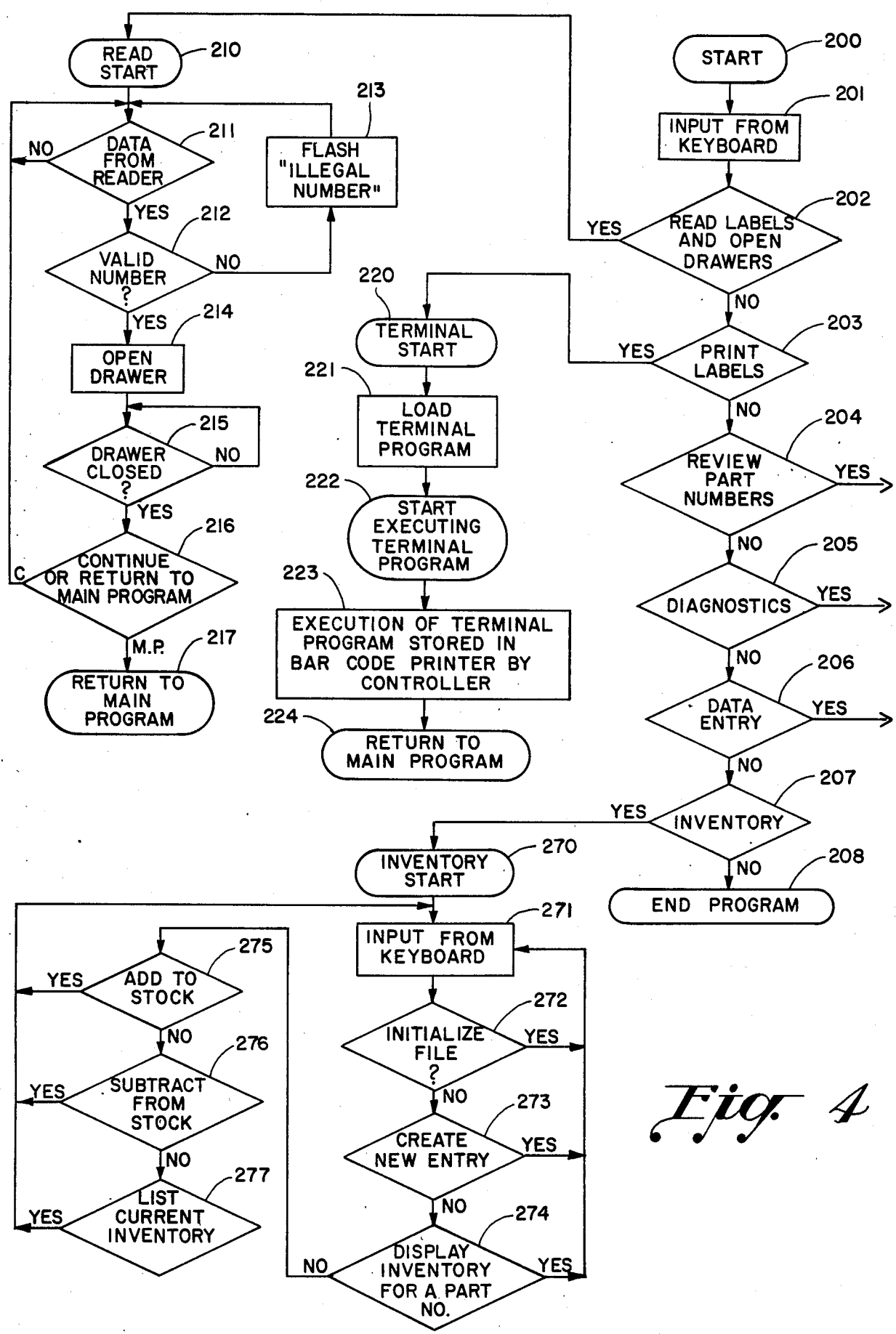
FIGS. 4 and 5 are flow charts illustrating, in combination the various steps carried out by a controller in the automatic storage and retrieval method of the present invention.
Figure 5:
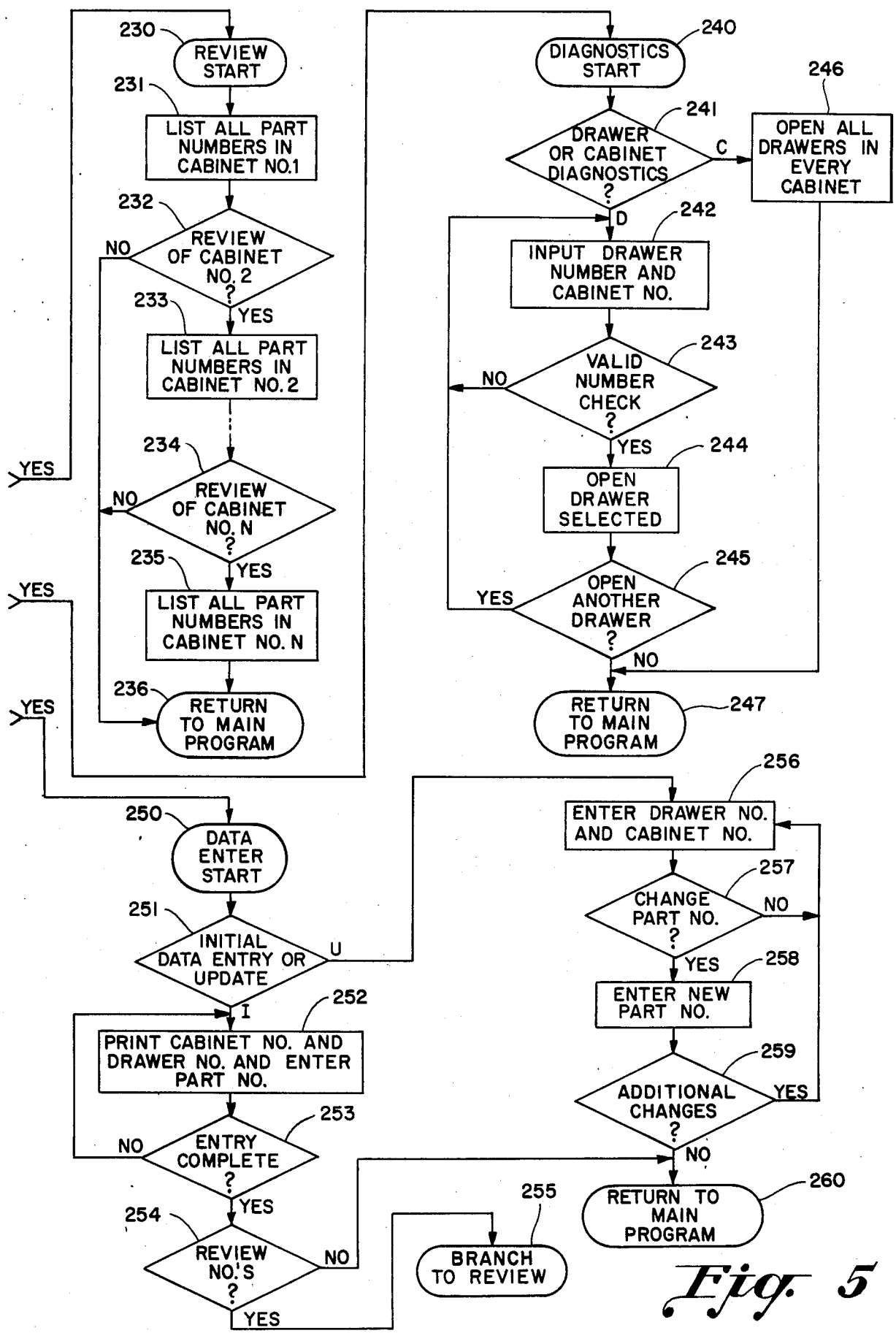

The operating program loaded into the microcomputer controller's RAM 27 from the disk drive 25 is initiated at step 200 as shown in FIG. 4. The "main program", as it is hereinafter termed, refers to the primary tasks performed in the storage and retrieval system which are illustrated in steps 200 through 208. The flow charts of FIGS. 4 and 5 includes additional details of each of these primary tasks which are described in detail in the following paragraphs. Upon completion of a primary task, the operation of the controller returns to the main operating program as described below.

Following initiation of the storage and retrieval program at step 200, the program at step 201 determines if any user-initiated inputs have been provided via the keyboard 30 coupled to the controller 24,

TABLE I

MELF.BAS

```
10      OPTION BASE 1
20      DIM LSR(30),DATA1(14),DATA2(14),DATA3(14),DATA4(14),DATA5(14),DATA6(14),DA
30      PASS=0
40      OPEN "I",#2,"PARTS.DAT"
50      FOR J=1 TO 7
60      FOR I=1 TO 14
70      IF EOF(2) THEN 110
80      INPUT#2,CAB$(I,J),REC(I,J)
90      NEXT I
100     NEXT J
110     CLOSE #2
120     CLS : BEEP
130     LOCATE 1,70 : SCREEN 0,1 : PRINT " PLANT 14 " : SCREEN ,0
140     LOCATE 8,16 : SCREEN 0,1 : PRINT "       M E L F   S T O R A G E     S Y S
150     KEY ON : FLAG=0
160       PN=&H60         'base address for Vector Interfacer II card
170       STATUS=&H61     'status port
180       CONTROL=&H61    'control port
190       GOSUB 2610      'drawer data loading routine
200       GOSUB 3190      'inventory routine
210       GOSUB 2580      'clear PIO
220       GOSUB 3200      'inventory routine
230     FLAG=0
240     LOCATE 12,5 : PRINT  "1) READ LABELS"
250     LOCATE 13,5 : PRINT  "2) PRINT LABELS (using terminal program upon boot-up
260     LOCATE 14,5 : PRINT  "3) REVIEW MELF COMPONENT NUMBERS"
270     LOCATE 15,5 : PRINT  "4) CABINET DIAGNOSTICS"
280     LOCATE 16,5 : PRINT  "5) DATA ENTRY (initial or drawer-by-drawer)"
290     LOCATE 17,5 : PRINT  "6) INVENTORY"
300     LOCATE 18,5 : PRINT  "7) EXIT PROGRAM"
310     LOCATE 21,1 : PRINT " Enter 1,2,3,4,5,6, or 7 for your selection:"
320     A$= INKEY$ : IF A$="" THEN 320
330     IF A$="1" THEN 410
340     IF A$="2" THEN 5050
350     IF A$="3" THEN GOTO 1260
360     IF A$="4" THEN GOTO 1990
370     IF A$="5" THEN GOTO 4610
380     IF A$="6" THEN 3240
390     IF A$="7" THEN 5050 : ELSE 320
400     IF FLAG=5 THEN GOTO 3240
410       TIMER=200     'load TIMER value for SOL ON time
420       COUNTR=200    'counter for message display
430       OUT &H60,0
440       JNK=INP(PN) : JNK=0      'clear held over byte in buffer
450     CLS
460     LOCATE 10,5 : SCREEN 0,1 : PRINT "COMMAND" : SCREEN ,0 : LOCATE 10,12 : PR
470     LOCATE 12,1 : PRINT "ZENITH PART NUMBER:  " : LOCATE 12,50 :PRINT "QUANTIT
480     I=0
490     I=I+1
500       IF (INP(STATUS) AND 2)<>2 THEN 500
510       LSR(I)=INP(PN)
520     IF LSR(I)<>10 THEN 490        '141
530     L$(2)=""
```

```
540   FOR X=1 TO (I-1):L$(2)=L$(2)+CHR$(LSR(X) AND 127) : NEXT X
550   I=0
560   GOSUB 2880
570   LOCATE 14,50 : PRINT L$(3): LOCATE 14,1
580   J=0
590   FOR I=1 TO 14 : IF CAB$(I,1)=L$(1) THEN REC=REC(I,1):GOTO 790
600   NEXT I
610   J=1
620   FOR I=1 TO 14 : IF CAB$(I,2)=L$(1) THEN REC=REC(I,2):GOTO 800
630   NEXT I
640   J=2
650   FOR I=1 TO 14 : IF CAB$(I,3)=L$(1) THEN REC=REC(I,3):GOTO 810
660   NEXT I
670   J=3
680   FOR I=1 TO 14 : IF CAB$(I,4)=L$(1) THEN REC=REC(I,4):GOTO 820
690   NEXT I
700   J=4
710   FOR I=1 TO 14 : IF CAB$(I,5)=L$(1) THEN REC=REC(I,5):GOTO 830
720   NEXT I
730   J=5
740   FOR I=1 TO 14 : IF CAB$(I,6)=L$(1) THEN REC=REC(I,6):GOTO 840
750   NEXT I
760   J=6
770   LOCATE 12,25 : SCREEN 0,1 : PRINT "INVALID PART NUMBER!" : SCREEN ,0
780   GOTO 410
790   PRINT L$(1) : OUT &H68,DATA1(I) : GOTO 860
800   PRINT L$(1) : OUT &H68,DATA2(I) : GOTO 860
810   PRINT L$(1) : OUT &H68,DATA3(I) : GOTO 860
820   PRINT L$(1) : OUT &H68,DATA4(I) : GOTO 860
830   PRINT L$(1) : OUT &H69,DATA5(I) : GOTO 860
840   PRINT L$(1) : OUT &H69,DATA6(I) : GOTO 860
850   PRINT L$(1) : OUT &H69,DATA7(I) : GOTO 860
860   TIMER=TIMER-1
870   IF TIMER<>0 THEN GOTO 860 ELSE OUT &H68,&H0 : OUT &H69,&H0
880   COUNTR=COUNTR-1 : IF COUNTR=0 THEN GOTO 890 : ELSE 880
890   IF L$(3)<>""THEN GOSUB 3450
900   LOCATE 15,5 : SCREEN 0,1 : PRINT "STATUS" : SCREEN ,0
910   P1=INP(&H68)
920   IF (P1 AND 1)<>1 THEN GOTO 950 ELSE LOCATE 15,22
930   PRINT ": CABINET #1 HAS AN OPEN DRAWER --- CLOSE IT"
940   GOTO 910
950   P1=INP(&H68)
960   IF (P1 AND 2)<>2 THEN GOTO 990 ELSE LOCATE 15,22
970   PRINT ": CABINET #2 HAS AN OPEN DRAWER --- CLOSE IT"
980   GOTO 950
990   P1=INP(&H68)
1000  IF (P1 AND 4)<>4 THEN GOTO 1030 ELSE LOCATE 15,22
1010  PRINT ": CABINET #3 HAS AN OPEN DRAWER --- CLOSE IT"
1020  GOTO 990
1030  P1=INP(&H68)
1040  IF (P1 AND 8)<>8 THEN GOTO 1070 ELSE LOCATE 15,22
1050  PRINT ": CABINET #4 HAS AN OPEN DRAWER --- CLOSE IT"
1060  GOTO 1030
1070  P2=INP(&H69)
1080  IF (P2 AND 16)<>16 THEN GOTO 1110 ELSE LOCATE 15,22
1090  PRINT ": CABINET #5 HAS AN OPEN DRAWER --- CLOSE IT"
1100  GOTO 1070
1110  P2=INP(&H69)
1120  IF (P2 AND 32)<>32 THEN GOTO 1150 ELSE LOCATE 15,22
1130  PRINT ": CABINET #6 HAS AN OPEN DRAWER --- CLOSE IT"
1140  GOTO 1110
1150  P2=INP(&H69)
1160  IF (P2 AND 64)<>64 THEN GOTO 1190 ELSE LOCATE 15,22
1170  PRINT ": CABINET #7 HAS AN OPEN DRAWER --- CLOSE IT"
1180  GOTO 1150
1190  CLS : LOCATE 20,5 : PRINT "M returns to the main menu or E exits program:'
1200  PS1=50            'response time for entry from keyboard
1210  X$=INKEY$
1220  IF X$="M" THEN 40
1230  IF X$="E" THEN 5050
1240  PS1=PS1-1 : IF PS1<>0 THEN GOTO 1210
1250  GOTO 410
1260  CLS : SCREEN 0,1 : LOCATE 1,1: PRINT "                    "
1270  LOCATE 2,1: PRINT "         CABINET # 1
1280  '
1290    GOSUB 2800
1300    FOR I=1 TO 14 : LOCATE NP,6 : PRINT DN : DN=DN+1 : LOCATE NP,18
```

```
1310        PRINT CAB$(I,1) : NP=NP+1 : NEXT I
1320        LOCATE 23,5 : PRINT "DO YOU WISH TO SEE THE PARTS IN CABINET#2 ? (Y/N)"
1330        C$=INKEY$ : IF C$="" THEN GOTO 1330
1340        IF C$="Y" THEN GOTO 1360
1350        IF C$="N" THEN GOTO 1970 : ELSE GOTO 1330
1360        CLS: SCREEN 0,1 : LOCATE 1,1: PRINT "                                    "
1370        LOCATE 2,1: PRINT "       CABINET # 2                  "
1380        '
1390        GOSUB 2800
1400        FOR I=1 TO 14 : LOCATE NP,6 : PRINT DN : DN=DN+1 : LOCATE NP,18
1410        PRINT CAB$(I,2) : NP=NP+1 : NEXT I
1420        LOCATE 23,5 : PRINT "DO YOU WISH TO SEE THE PARTS IN CABINET#3 ? (Y/N)"
1430        C$=INKEY$ : IF C$="" THEN GOTO 1430
1440        IF C$="Y" THEN GOTO 1460
1450        IF C$="N" THEN GOTO 1970 : ELSE GOTO 1430
1460        CLS : SCREEN 0,1 : LOCATE 1,1: PRINT "                                   "
1470        LOCATE 2,1: PRINT "       CABINET # 3                  "
1480        '
1490        GOSUB 2800
1500        FOR I=1 TO 14 : LOCATE NP,6 : PRINT DN : DN=DN+1 : LOCATE NP,18
1510        PRINT CAB$(I,3) : NP=NP+1 : NEXT I
1520        LOCATE 23,5 : PRINT "DO YOU WISH TO SEE THE PARTS IN CABINET#4 ? (Y/N)"
1530        C$=INKEY$ : IF C$="" THEN GOTO 1530
1540        IF C$="Y" THEN GOTO 1560
1550        IF C$="N" THEN GOTO 1970 : ELSE GOTO 1530
1560        CLS : SCREEN 0,1 : LOCATE 1,1: PRINT "                                   "
1570        LOCATE 2,1: PRINT "       CABINET # 4                  "
1580        '
1590        GOSUB 2800
1600        FOR I=1 TO 14 : LOCATE NP,6 : PRINT DN : DN=DN+1 : LOCATE NP,18
1610        PRINT CAB$(I,4) : NP=NP+1 : NEXT I
1620        LOCATE 23,5 : PRINT "DO YOU WISH TO SEE THE PARTS IN CABINET#5 ? (Y/N)"
1630        C$=INKEY$ : IF C$="" THEN GOTO 1630
1640        IF C$="Y" THEN GOTO 1660
1650        IF C$="N" THEN GOTO 1970 : ELSE GOTO 1630
1660        CLS : SCREEN 0,1 : LOCATE 1,1: PRINT "                                   "
1670        LOCATE 2,1: PRINT "       CABINET # 5                  "
1680        '
1690        GOSUB 2800
1700        FOR I=1 TO 14 : LOCATE NP,6: PRINT DN : DN=DN+1 : LOCATE NP,18
1710        PRINT CAB$(I,5) : NP=NP+1 : NEXT I
1720        LOCATE 23,5 : PRINT "DO YOU WISH TO SEE THE PARTS IN CABINET#6 ? (Y/N)"
1730        C$=INKEY$ : IF C$="" THEN 1730
1740        IF C$="Y" THEN 1760
1750        IF C$="N" THEN 1970 : ELSE 1730
1760        CLS : SCREEN 0,1 : LOCATE 1,1 : PRINT "                                  "
1770        LOCATE 2,1: PRINT "       CABINET # 6                  "
1780        '
1790        GOSUB 2800
1800        FOR I=1 TO 14 : LOCATE NP,6 : PRINT DN : DN=DN+1 : LOCATE NP,18
1810        PRINT CAB$(I,6) : NP=NP+1 : NEXT I
1820        LOCATE 23,5 : PRINT "DO YOU WISH TO SEE THE PARTS IN CABINET#7 ? (Y/N)"
1830        C$=INKEY$ : IF C$="" THEN 1830
1840        IF C$="Y" THEN 1860
1850        IF C$="N" THEN 1970 : ELSE 1830
1860        CLS : SCREEN 0,1 : LOCATE 1,1: PRINT "                                   "
1870        LOCATE 2,1: PRINT "       CABINET # 7                  "
1880        '
1890        GOSUB 2800
1900        FOR I=1 TO 14 : LOCATE NP,6: PRINT DN : DN=DN+1 : LOCATE NP,18
1910        PRINT CAB$(I,7) : NP=NP+1 : NEXT I
1920        LOCATE 23,5 : PRINT "DO YOU WISH TO SEE THE PARTS IN CABINET#1 ? (Y/N)"
1930        C$=INKEY$ : IF C$="" THEN 1930
1940        IF C$="Y" THEN 1260
1950        IF C$="N" THEN 1970 : ELSE 1930
1960        '
1970        CLS : BEEP : FLAG=0 : CLOSE#1 : GOTO 120    'back to main menu
1980        '
1990        CLS : BEEP : LOCATE 1,1 : SCREEN 0,1 : PRINT "                          CA
2000        LOCATE 12,1 : PRINT "ENTER DRAWER OR CABINET DIAGNOSTIC (D/C)" :SCREEN
2010        W$=INKEY$ : IF W$="" THEN GOTO 2010
2020        IF W$="D" THEN GOTO 2300
2030        IF W$="C" THEN GOTO 2050 ELSE GOTO 2010
2040        CNT=1 : CLS : LOCATE 12,28 : PRINT "DRAWER NUMBER:     "
2050        FOR I=17 TO 126        'extend data to 126 for 7 cabinets
2060        IF I=31 THEN 2280
2070        IF I=32 THEN 2280
2080        IF I=47 THEN 2280
```

```
2090        IF I=48 THEN 2280
2100        IF I=63 THEN 2280
2110        IF I=64 THEN 2280
2120        IF I=79 THEN 2280
2130        IF I=80 THEN 2280
2140        IF I=95 THEN 2280
2150        IF I=96 THEN 2280
2160        IF I=111 THEN 2280
2170        IF I=112 THEN 2280
2180        LOCATE 12,48 : PRINT CNT
2190        Z=125
2200        OUT &H68,I
2210        OUT &H69,I
2220        W=50
2230        W=W-1 : IF W<>0 THEN GOTO 2230
2240        OUT &H68,0
2250        OUT &H69,0
2260        Z=Z-1 : IF Z<>0 THEN GOTO 2260
2270        CNT=CNT+1
2280        NEXT I
2290        GOTO 120
2300        CLS: LOCATE 10,25 : INPUT "OPEN DRAWER NUMBER (1-14)";I
2310        LOCATE 12,26 : INPUT "IN CABINET NUMBER (1-7)";J
2320        TIMER=100
2330        IF J<>1 THEN GOTO 2350
2340        OUT &H68,DATA1(I) : GOTO 2490
2350        IF J<>2 THEN GOTO 2370
2360        OUT &H68,DATA2(I) : GOTO 2490
2370        IF J<>3 THEN GOTO 2390
2380        OUT &H68,DATA3(I) : GOTO 2490
2390        IF J<>4 THEN GOTO 2410
2400        OUT &H68,DATA4(I) : GOTO 2490
2410.       IF J<>5 THEN GOTO 2430
2420        OUT &H69,DATA5(I) : GOTO 2490
2430        IF J<>6 THEN 2450
2440        OUT &H69,DATA6(I) : GOTO 2490
2450        IF J<>7 THEN 2470
2460        OUT &H69,DATA7(I) : GOTO 2490
2470        CLS : BEEP : LOCATE 15,12 : PRINT "***** INVALID DATA ENTERED *****"
2480        GOTO 2300
2490        TIMER=TIMER-1 : IF TIMER <>0 THEN 2490
2500        OUT &H68,0
2510        OUT &H69,0
2520        CLS : LOCATE 7,1 : PRINT "DO YOU WISH TO OPEN ANOTHER DRAWER? (Y/N --- g(
2530        Q$=INKEY$ : IF Q$="" THEN GOTO 2530
2540        IF Q$="Y" THEN GOTO 2300
2550        IF Q$="N" THEN GOTO 120 : ELSE GOTO 2530
2560        '
2570                            'CLRPIO SUBROUTINE
2580        OUT &H68,&H0 : OUT &H69,&H0 :    '    CLRPIO SUBROUTINE
2590        RETURN
2600        GOTO 120
2610        '
2620        ' subroutine to load data to control drawers
2630        HEXD1=&H10
2640        FOR Y=1 TO 14 : DATA1(Y)=HEXD1+1 : HEXD1=HEXD1+1 : NEXT Y
2650        HEXD2=&H20
2660        FOR Y=1 TO 14 : DATA2(Y)=HEXD2+1 : HEXD2=HEXD2+1 : NEXT Y
2670        HEXD3=&H30
2680        FOR Y=1 TO 14 : DATA3(Y)=HEXD3+1 : HEXD3=HEXD3+1 : NEXT Y
2690        HEXD4=&H40
2700        FOR Y=1 TO 14 : DATA4(Y)=HEXD4+1 : HEXD4=HEXD4+1 : NEXT Y
2710        HEXD5=&H50
2720        FOR Y=1 TO 14 : DATA5(Y)=HEXD5+1 : HEXD5=HEXD5+1 : NEXT Y
2730        HEXD6=&H60
2740        FOR Y=1 TO 14 : DATA6(Y)=HEXD6+1 : HEXD6=HEXD6+1 : NEXT Y
2750        HEXD7=&H70
2760        FOR Y=1 TO 14 : DATA7(Y)=HEXD7+1 : HEXD7=HEXD7+1 : NEXT Y
2770        RETURN
2780        '
2790        ' SUB----- part reviewing display
2800        LOCATE 3,1 : PRINT "                              "
2810        LOCATE 4,1 : SCREEN ,0 : PRINT "****************************************
2820        LOCATE 5,4 : PRINT "DRAWER" : LOCATE 5,18 : PRINT "ZENITH " : LOCATE 6,6
2830        NP=7 : DN= 1
2840        RETURN
2850        '
2860        '
```

```
2870  ' SUB----- string fix
2880  K=0:L$(1)="":L$(3)="":L$(4)=""
2890  IF RIGHT$(L$(2),1)=CHR$(13) THEN L$(2)=LEFT$(L$(2),LEN(L$(2))-1)
2900  I=I+1
2910  L$(5)=MID$(L$(2),I,1)
2920  IF L$(5)="0"THEN IF I=LEN(L$(2))THEN 2950 ELSE 2900
2930  GOSUB 3070
2940  IF I<LEN(L$(2))THEN 2900
2950  GOSUB 3160
2960  GOSUB 2980
2970  RETURN
2980  M=LEN(L$(4)):K=M
2990  FOR X=1 TO M
3000  L$(5)=MID$(L$(4),X,1)
3010  IF L$(5)="\"THEN K=X-1
3020   NEXT X
3030  L$(1)=LEFT$(L$(4),K)
3040  IF K=M THEN L$(3)="":GOTO 3060
3050  L$(3)=RIGHT$(L$(4),M-(K+1))
3060  RETURN
3070  IF L$(5)="\" THEN GOSUB 3160
3080  L$(4)=L$(4)+L$(5)
3090  IF L$(5)="-" THEN RETURN
3100  IF L$(5)="\" THEN RETURN
3110  I=I+1
3120  L$(5)=MID$(L$(2),I,1)
3130  L$(4)=L$(4)+L$(5)
3140  IF L$(5)="\" THEN RETURN
3150  IF I<LEN(L$(2))THEN 3090 ELSE RETURN
3160  IF RIGHT$(L$(4),1)="-" THEN 3180
3170  RETURN
3180  L$(4)=LEFT$(L$(4),LEN(L$(4))-1)
3190  RETURN
3200  'open file
3210  OPEN "R",#1,"INVEN.DAT",90
3220  FIELD#1, 14 AS PART$, 10 AS QUAN$, 7 AS LS$, 25 AS DES$, 8 AS COL1$, 8 AS CO
3230  RETURN
3240  CLS:PRINT:PRINT:PRINT "FUNCTIONS:":PRINT
3250  QUE=0
3260  PRINT  "1)   INITIALIZE FILE"
3270  PRINT  "2)   CREATE A NEW ENTRY"
3280  PRINT  "3)   DISPLAY INVENTORY FOR ONE PART"
3290  PRINT  "4)   ADD TO STOCK"
3300  PRINT  "5)   SUBTRACT FROM STOCK"
3310  PRINT  "6)   LIST CURRENT INVENTORY & ALL ITEMS BELOW MINIMUM LEVEL"
3320  PRINT "Key in selection 1 to 6"
3330  A$=INKEY$: IF A$="" THEN 3330
3340  IF A$="1" THEN QUE=1:GOSUB 3960
3350  IF A$="2" THEN QUE=1:GOSUB 4060
3360  IF A$="3" THEN QUE=1:C=3:GOSUB 3580
3370  IF A$="4" THEN QUE=1:C=1:GOSUB 3580
3380  IF A$="5" THEN QUE=1:C=2:GOSUB 3580
3390  IF A$="6" THEN QUE=1:GOSUB 4290
3400  IF QUE=0 THEN 3320
3410  LOCATE 22,1:PRINT "DO YOU WANT ANOTHER FUNCTION?"
3420  PRINT "Enter Y or N."
3430  A$=INKEY$:IF A$="" THEN 3430
3440  IF A$="Y" THEN 3240 ELSE CLS : GOTO 230
3450  'inventory prompt
3460  QUE=0
3470  LOCATE 18,5 : SCREEN 0,1 : PRINT "INVENTORY" :SCREEN ,0
3480  PRINT "DO YOU WANT TO?"
3490  PRINT "1)    ADD TO STOCK"
3500  PRINT "2)    SUBTRACT FROM STOCK"
3510  PRINT "3)    NOT AFFECT STOCK"
3520  A$=INKEY$:IF A$="" THEN 3520
3530  IF A$="1" THEN QUE=1:GOSUB 3720
3540  IF A$="2" THEN QUE=1:GOSUB 3790
3550  IF A$="3" THEN QUE=1: CLS : RETURN
3560  IF QUE=0 THEN PRINT "KEY-IN 1,2,or3":GOTO 3520
3570  CLS :RETURN
3580  INPUT "PART NO.",PNO$
3590  IF PNO$="" THEN 3710
3600  I=0:L$(2)=PNO$:GOSUB 2880
3610  IF C=3 THEN 3630
3620  INPUT "QUANTITY";L$(3)
3630  B=0
3640  B=B+1:A=0
3650  A=A+1
```

```
3660 IF L$(1)=CAB$(A,B) THEN REC=REC(A,B):GOTO 3690
3670 IF B<6 THEN IF A<14 THEN 3650
3680 IF B<6 THEN 3640 ELSE 3710
3690 ON C GOSUB 3720,3790,3870
3700 RETURN
3710 PRINT "NOT A LISTED PART NO.":RETURN
3720 'add parts
3730   GET #1,REC
3740   QUA#=VAL(L$(3))
3750   QUAN#=CVD(QUAN$)+QUA#
3760   LSET QUAN$=MKD$(QUAN#)
3770   PUT#1,REC
3780   RETURN
3790   'subtract parts
3800   GET#1,REC
3810   QUA#= VAL(L$(3))
3820   QUAN#=CVD(QUAN$)-QUA#
3830   LSET QUAN$=MKD$(QUAN#)
3840   PUT#1,REC
3850   RETURN
3860 GET#1,E
3870 GET#1,REC
3880 QUA=CVD(QUAN$)
3890 MIN=VAL(LS$)
3900 PRINT "PART NO.   ";PART$
3910 PRINT "QUANTITY IN STOCK   ";QUA
3920 PRINT "MINIMUM QUANTITY   ";MIN
3930 PRINT DES$;"    ";VLU$
3940 GOSUB 5160
3950 RETURN
3960 'initialize file
3970   PRINT "This function will erase all inventory data."
3980   INPUT "Enter Y or N - ARE YOU SURE";B$: IF B$<>"Y" THEN RETURN
3990   LSET PART$=CHR$(255)
4000   LSET QUAN$=MKD$(0)
4010   LSET LS$=STR$(0)
4020   FOR I=1 TO 98
4030   PUT #1,I
4040   NEXT I
4050   RETURN
4060   'create a new entry
4070   INPUT "PART NUMBER",PAR$
4080   LSET PART$=PAR$
4090   INPUT "QUANTITY IN STOCK",QUA
4100   LSET QUAN$=MKD$(QUA)
4110   INPUT "MINIMUM QUANTITY",MI
4120   LSET LS$=STR$(MI)
4130   INPUT "DESCRIPTION",DE$
4140   LSET DES$=DE$
4150   INPUT "First Color",CO1$
4160   LSET COL1$=CO1$
4170   INPUT "Second Color",CO2$
4180   LSET COL2$=CO2$
4190   INPUT "Third Color",CO3$
4200   LSET COL3$=CO3$
4210   INPUT "COMPONENT VALUE",VL$
4220   LSET VLU$=VL$
4230   INPUT "RECORD NO",REC
4240   PUT#1,REC
4250   PRINT "DO YOU WANT TO MAKE ANOTHER ENTRY?, Y or N."
4260   A$=INKEY$:IF A$="" THEN 4260
4270   IF A$="Y" THEN 4070 ELSE CLS
4280   GOTO 230
4290 'print inventory
4300 PRINT " DO YOU WANT TO OUTPUT ON CRT(C) OR PRINTER(P)?"
4310 A$=INKEY$: IF A$="" THEN 4310
4320 IF A$<>"C" THEN IF A$<>"P" THEN 4300
4330 CLS: IF A$="P" THEN GOSUB 4450
4340 FOR I=1 TO 70
4350 GET#1,I
4360 STAT$=""
4370 IF VAL(LS$)>CVD(QUAN$) THEN STAT$=" BELOW MINIMUM"
4380 PRINT PART$, CVD(QUAN$), LS$, STAT$
4390 IF A$="P" THEN IF I<51 THEN LPRINT TAB(1) PART$ TAB(15) CVD(QUAN$) TAB(28) LS
4400 STAT$=""
4410  IF A$="P" THEN IF I=51 THEN LPRINT
4420 IF A$="P" THEN GOSUB 4530
4430 NEXT I
4440 RETURN
```

```
4450 INPUT "ENTER DATE (MM-DD-YYYY)";Z$:IF Z$<>"" THEN DATE$=Z$
4460  INPUT "ENTER TIME (HH:MM:SS)";Z$:IF Z$<>"" THEN TIME$=Z$
4470  WIDTH LPRINT 250
4480  LPRINT TAB(20) "CHIP INVENTORY       ";DATE$; " TIME ";TIME$
4490  LPRINT TAB(15) "*****************************************************"
4500  LPRINT
4510  LPRINT "PART NO." TAB(16) "STOCK" TAB(26) "MIN STOCK" TAB(38) "STATUS" TAB(6
4520  LPRINT:RETURN
4530  IF I<21 THEN GET#1,I+50 ELSE RETURN
4540  IF VAL(LS$)>CVD(QUAN$) THEN STAT$="BELOW MINIMUM"
4550  LPRINT TAB(62) PART$ TAB(80) CVD(QUAN$) TAB(90) LS$ TAB(100) STAT$
4560 RETURN
4570 LPRINT ""
4580 RETURN
4590      '
4600      '
4610      ' data entry and modification file
4620      '
4630      CLS : BEEP : LOCATE 1,1 : SCREEN 0,1 : LOCATE 1,10 : PRINT "Z E N I T H
4640      LOCATE 8,5 : PRINT "Initial data entry (I) or drawer-by-drawer entry (D
4650      LOCATE 10,5 : PRINT "Enter I or D for your selection:"
4660      Z$=INKEY$: IF Z$="" THEN 4660
4670      IF Z$="I" THEN 4690
4680      IF Z$="D" THEN 4850 : ELSE 4660
4690      CLS : IF PASS=1 THEN 110
4700      OPEN "O",#2,"PARTS14.DAT"
4710      FOR J=1 TO 7
4720      FOR I=1 TO 14
4730      LOCATE 8,5 : PRINT "CABINET NUMBER";J "AND DRAWER NUMBER";I
4740      LOCATE 10,5 : INPUT "ZENITH PART NUMBER:  ";CAB$(I,J),REC(I,J)
4750      IF CAB$(I,J)="EXIT" THEN 4790
4760      WRITE#2,CAB$(I,J),REC(I,J) : CLS : BEEP
4770      NEXT I
4780      NEXT J
4790      CLOSE #2 : PASS=1
4800      CLS : LOCATE 10,1 : PRINT "Do you wish to review parts or go to menu?"
4810      LOCATE 11,1 : PRINT "Enter R or M for your selection: "
4820      A$=INKEY$ : IF A$="" THEN 4820
4830      IF A$="R" THEN 1260
4840      IF A$="M" THEN 120 : ELSE 4820
4850      CLS : LOCATE 8,5 : INPUT "CHANGE THE PART NUMBER IN DRAWER (1 TO 14)",X
4860      LOCATE 10,7 : INPUT "OF CABINET NUMBER (1 TO 7)",Y
4870      IF (X>14) THEN 5060
4880      IF (X<1)  THEN 5060
4890      IF (Y>7)  THEN 5060
4900      IF (Y<1)  THEN 5060
4910      LOCATE 14,5 : INPUT "ZENITH PART NUMBER:";CAB$(X,Y),REC(X,Y)
4920      CLS : LOCATE 20,5 : PRINT "Change another part number or go to menu?"
4930      LOCATE 21,6 : PRINT "Enter C or M for your selection:"
4940      Y$=INKEY$ : IF Y$="" THEN 4940
4950      IF Y$="C" THEN 4850
4960      IF Y$="M" THEN 4970 : ELSE 4940
4970      OPEN "O",#2,PARTS.DAT"
4980      FOR Q=1 TO 7
4990      FOR P=1 TO 14
5000      WRITE#2,CAB$(P,Q),REC(P,Q)
5010      NEXT P
5020      NEXT Q
5030      CLOSE #2
5040      GOTO 120
5050      CLS : SYSTEM
5060      CLS : LOCATE 10,1 : PRINT "YOU HAVE ENTERED AN INVALID CABINET OR DRAWE
5070      T=200
5080      T=T-1
5090      IF T=0 THEN 4850 : ELSE 5080
5100      END
5110 FOR X=1 TO LEN(L$(1))
5120 L$(5)=MID$(L$(1),X,1)
5130 PRINT ASC(L$(5))
5140 NEXT X
5150 END
5160 IF LEFT$(L$(1),7)="22-7920" THEN 5410
5170 IF LEFT$(L$(1),2)="22" THEN 5220
5180 IF LEFT$(L$(1),2)="63" THEN 5220
5190 IF RIGHT$(L$(1),1)="A" THEN 5700
5200 IF LEFT$(L$(1),3)="103" THEN 5220
5210 RETURN
5220 CIRCLE(550,10),75,,,,.1
```

```
5230 Y=20:GOSUB 5390
5240 Y=35:GOSUB 5390
5250 Y=65:GOSUB 5390
5260 Y=80:GOSUB 5390
5270 IF LEFT$(L$(1),3)="103" THEN 5310
5280 Y=110:GOSUB 5390
5290 Y=125:GOSUB 5390
5300 Y=155:GOSUB 5390
5310 Y=175:GOSUB 5390
5320 Y=185:GOSUB 5390
5330 LINE(475,10)-(475,185)
5340 LINE(625,10)-(625,185)
5350 LOCATE 7,65:PRINT COL1$
5360 LOCATE 12,65:PRINT COL2$
5370 LOCATE 17,65:PRINT COL3$
5380 RETURN
5390 CIRCLE(550,Y),75,,3.142,6.283,.1
5400 RETURN
5410 GOSUB 5450
5420 GOSUB 5500
5430 GOSUB 5600
5440 RETURN
5450 LINE(465,10)-(465,100)
5460 LINE(700,10)-(700,100)
5470 CIRCLE(620,25),7
5480 CIRCLE(620,75),7
5490 RETURN
5500 PSET(485,35)
5510 DR$="D30R115U30L115"
5520 DRAW DR$
5530 PSET(485,10)
5540 DR$="D5R115U5"
5550 DRAW DR$
5560 PSET(485,100)
5570 DR$="U15R115D15"
5580 DRAW DR$
5590 RETURN
5600 PSET(500,10)
5610 DR$="D5R85U5"
5620 DRAW DR$
5630 PSET(500,35)
5640 DR$="D30R85U30"
5650 DRAW DR$
5660 PSET(500,100)
5670 DR$="U15R85D15"
5680 DRAW DR$
5690 RETURN
5700 GOSUB 5450
5710 CHIP$=MID$(L$(1),8,1)
5720 IF CHIP$="6" THEN 5780
5730 IF CHIP$="5" THEN 5880
5740 IF CHIP$="7" THEN 5890
5750 IF CHIP$="8" THEN 5890
5760 IF CHIP$="A" THEN 6030
5770 RETURN
5780 GOSUB 6130
5790 PSET(515,35):GOSUB 6260
5800 PSET(515,59):GOSUB 6230
5810 PSET(565,59):GOSUB 6230
5820 PSET(565,35):GOSUB 6230
5830 PSET(515,85):GOSUB 6260
5840 PSET(515,9):GOSUB 6230
5850 PSET(565,85):GOSUB 6230
5860 PSET(565,9):GOSUB 6230
5870 RETURN
5880 IF MID$(L$(1),9,1)="A" THEN 5960 ELSE 5890
5890 GOSUB 6130
5900 PSET(515,35):GOSUB 6230
5910 PSET(515,59):GOSUB 6230
5920 PSET(565,47):GOSUB 6230
5930 PSET(515,9):GOSUB 6230
5940 PSET(515,85):GOSUB 6230
5950 RETURN
```

```
5960 GOSUB 6130
5970 PSET(565,35):GOSUB 6230
5980 PSET(565,59):GOSUB 6230
5990 PSET(515,47):GOSUB 6230
6000 PSET(565,9):GOSUB 6230
6010 PSET(565,85):GOSUB 6230
6020 RETURN
6030 GOSUB 5500
6040 PSET(470,47):GOSUB 6230
6050 PSET(600,47):GOSUB 6230
6060 IF RIGHT$(L$(1),2)="7A" THEN 6100
6070 LOCATE 5,70:PRINT "PLAT-"
6080 LOCATE 6,70:PRINT "EADO"
6090 RETURN
6100 LOCATE 5,62:PRINT "AMA-"
6110 LOCATE 6,62:PRINT "RILLO"
6120 RETURN
6130 PSET(530,30)
6140 DR$="R35D40L35U40"
6150 DRAW DR$
6160 PSET(530,10)
6170 DR$="D10R35U10"
6180 DRAW DR$
6190 PSET(530,100)
6200 DR$="U20R35D20"
6210 DRAW DR$
6220 RETURN
6230 DR$="R15D6L15U6"
6240 DRAW DR$
6250 RETURN
6260 DR$="R15D12L15U12"
6270 DRAW DR$
6280 RETURN
```

PARTS14.DAT

```
"022-07984-11"
"022-07984-15"
"022-07985-00"
"022-07985-06"
"022-07985-09"
"022-07985-12"
"022-07985-13"
"022-07985-17"
"022-07985-22"
"022-07985-23"
"022-07986-10"
"022-07986-32"
"022-07986-34"
"022-07986-40"
"022-07987-10"
"022-07988-39"
"022-07988-40"
"022-07988-41"
"022-07988-42"
"022-07988-44"
"022-07989-47"
"022-07989-49"
"022-07989-51"
"022-07989-52"
"022-07991-00"
"063-10979-00"
"063-10979-01"
"063-10979-13"
"063-10979-18"
"063-10979-21"
"063-10979-32"
"063-10979-34"
"063-10979-39"
"063-10979-40"
"063-10979-47"
"063-10979-49"
"063-10979-51"
"063-10979-53"
"063-10979-54"
"063-10979-57"
"063-10979-58"
"063-10979-60"
"063-10979-61"
"063-10979-62"
"063-10979-64"
"063-10979-70"
"063-10979-72"
"063-10979-74"
"063-10979-76"
"063-10979-78"
"063-10979-83"
"063-10979-87"
"063-10979-93"
"103-00387-00"
"103-00392-00"
"103-00393-00"
"0"
"0"
"0"
"0"
"0"
"0"
"0"
"0"
"0"
"0"
"0"
"0"
"0"
"0"
"0"
"0"
"0"
"0"
"0"
"0"
"0"
"0"
"0"
"0"
"0"
"0"
"0"
"0"
"0"
"0"
"0"
"0"
"0"
"0"
"0"
```

Upon detection of inputs from the keyboard at step 201, the program proceeds to step 202 for reading a bar-coded label and opening a corresponding drawer. If at step 202, no bar coded labels have been read into memory by means of the laser bar code scanner 20, the program proceeds to step 203 and determines if new label information has been provided via keyboard 30 to the controller 24. If label data has been entered, the program branches to step 220 and initiates a TERMINAL sub-routine. If new label information has not been entered via keyboard 30, the program branches from step 203 to step 204 to determine if a review of stored part numbers has been requested. If such a request has been made via keyboard 30, the program branches to step 230 and initiates a PART REVIEW sub-routine. If at step 204 it is determined that a PARTS REVIEW has not been requested, the program branches to step 205 for initiating a DIAGNOSTICS sub-routine at step 240 if requested. If the DIAGNOSTICS sub-routine has not been requested, the program branches from step 205 to step 206 and initiates a DATA ENTRY sub-routine at step 250 if a user has entered data via keyboard 30. If no data has been entered, the program branches to step 207 and determines if the INVENTORY sub-routine has been selected and if selected, branches to step 270 and initiates the INVENTORY sub-routine. The INVENTORY sub-routine is the last of the sub-tasks monitored and performed by the storage and retrieval operating program stored within the controller's disk drive 25, with the program then branching to step 208 to the end of the operating program described above. Steps 200 through 208 represent the main operating program stored in the microcomputer's disk drive 25. Each of the aforementioned sub-routines is described individually in the following paragraphs.

The READ sub-routine represents the storage mode of operation and is initiated at step 210 with the reading of data detected by the laser bar code scanner 20 and provided to the bar code reader 22 into the controller 24. Following reading of the bar coded data into the controller 24 at step 211, the program at step 212 determines if the data is valid by comparing the input data with previously stored data in the controller's RAM 27. If at step 212 the program determines that an invalid bar code has been detected, the program proceeds to step 213 and initiates the flashing of an "ILLEGAL NUMBER" indication on the video display 28 at step 213 and then branches back to step 211 and awaits entry of valid data. Following detection of valid bar code data by the scanning beam transmitter/receiver 18, the program executes the opening of a drawer corresponding to the entered data at step 214 to allow a container to be either placed in or removed from the drawer. Following detection of closure of the drawer at step 215, the program proceeds to step 216 and either continues (C) to read additional data if entered by branching back to step 211 or returns to the main program (MP) at step 217.

If at step 202 a bar code label has not been detected by the laser bar code scanner 20 as determined by the controller 24, the program stored therein branches to step 203 and determines if the PRINT LABEL sub-routine has been selected. If the PRINT LABEL sub-routine has been selected by means of keyboard 30, the program then branches to step 220 and initiates the start of a TERMINAL sub-routine. In the TERMINAL sub-routine the controller functions merely as a terminal in controlling the operation of the video display in response to user initiated inputs provided via the keyboard 30. These user initiated inputs are provided via the controller 24 to another microcomputer (not shown) within the bar code printer 26 for the printing of bar coded labels to be applied to either the aforementioned component bags, the hopper, or the drawers in which the bags are stored. In this mode of operation, the controller 24 therefore operates in a passive manner in merely passing data entered on the keyboard 30 onto the video display 28 and the bar code printer 26. The first step in the TERMINAL sub-routine involves the loading of the terminal program into the controller 24 from the bar code printer 26 at step 221. At step 222 the controller 24 begins executing the terminal program which continues at step 223 until the entire terminal program is executed at which time the controller 24 returns to the main program at step 224.

If at step 203, it is determined that the PRINT LABEL sub-routine has not been selected, the program branches to step 204 for a determination of whether the REVIEW PART NUMBERS sub-routine has been selected. If the REVIEW PART NUMBERS sub-routine has been selected at step 204, the program branches to step 230 for initiation of execution of the REVIEW PART NUMBERS sub-routine. The first step in this sub-routine involves the listing of all part numbers in cabinet No. 1 at step 231. Review of the part numbers associated with the next cabinet number, which in this case is cabinet No. 2 and the listing of all part numbers in that cabinet occurs at step 233. This procedure continues in a sequential manner until all of the part numbers in all N cabinets have been reviewed at step 234, with the part numbers in the Nth cabinet displayed at step 235, whereupon the program returns to the main operating program at step 236. If at any point the user does not desire to review the part numbers associated with the next cabinet, the program branches to step 236 for return to the main operating program.

If at step 204, it is determined that the REVIEW PART NUMBERS sub-routine has not been selected, the program branches to step 205 for a determination of whether the DIAGNOSTICS sub-routine has been selected. If the DIAGNOSTICS sub-routine has been selected as determined at step 205, the program branches to step 240 and initiates the start of the DIAGNOSTICS sub-routine. The DIAGNOSTICS sub-routine executes a check for the proper operation of the electrical interface as well as the mechanical drive of each drawer. The first step in the DIAGNOSTICS sub-routine involves the determination at step 241 of whether the drawer (D) or cabinet (C) DIAGNOSTICS sub-routine has been selected. If the cabinet DIAGNOSTICS sub-routine has been selected, the program branches from step 241 to step 246 and the controller 24 provides appropriate signals to each of the drawers in every cabinet via an associated combination of an electrical interface and mechanical drive for effecting the opening thereof. Each drawer must be manually closed before the next drawer can be tested. After proper operation of all the drawers has been validated in step 246, the program proceeds to a return to the main operating program at step 247. If at step 241 it is determined that the drawer DIAGNOSTICS sub-routine has been selected, the program branches to step 242 and awaits input of the designated drawer number and cabinet number to be tested. Involved in the testing of the proper operation of a given drawer is the determination at step 243 of the validity of the drawer number selected. If a selected drawer number is not valid as determined at step 243, the program branches back to step 242 and awaits the input of valid drawer and cabinet numbers. If at step 243 it is determined that valid drawer and cabinet numbers have been entered in designating a given drawer to be tested, the program proceeds to step 244 and opens the drawer associated with the valid entered drawer number. The program then proceeds to step 245 and determines if another set of drawer and cabinet numbers have been entered for testing the operation thereof and if entered, branches back to step 242 and continues operation as described. If at step 245 it is determined that additional drawer and cabinet numbers have not been entered for testing, the program proceeds to step 247 and executes a return to the main operating program.

If at step 205, it is determined that the DIAGNOSTICS sub-routine has not been selected, the program branches to step 206 and determines whether the DATA ENTRY sub-routine has been selected and if so, branches to step 250 for initiation of the DATA ENTRY sub-routine. The DATA ENTRY sub-routine involves the initial entry or updating of bar coded data stored in the controller's RAM 27 and disk drive 25. If data is to be updated, the program branches at step 251 to step 256 for entry of the drawer number and cabinet number for which the part number information is to be updated. The program then proceeds to step 257 to await entry of a new part number. The program then executes a loop back to step 256 until the part number associated with the drawer number and cabinet number entered at step 256 is changed. Following an updating of the part number associated with the aforementioned drawer and cabinet numbers, the program proceeds to step 258 for entry of a new part number. The program then proceeds to step 259 and awaits entry of additional drawer and cabinet number information as well as an updating of the part number associated therewith. Following entry of all updated part number information, the program proceeds to step 260 and executes a return to the main operating program.

If at step 251 it is determined that initial part number information is to be entered and stored in the controller 24, the program branches to step 252 and prints out each pair of cabinet and drawer numbers and awaits entry of a part number associated therewith at step 252. Following completion of the entry of all of the initial part numbers for storage in the controller's RAM 27 as determined at step 253, the program branches to step 254 and executes a review with display of all of the cabinet and drawer numbers and part numbers associated therewith. Review of the initially entered part numbers is accomplished by branching to the REVIEW sub-routine at step 255 whereupon the REVIEW sub-routine is initiated at step 230 as previously described. If it is not desired to review all of the initially entered part numbers, the program branches from step 254 to step 260 and executes a return to the main operating program.

If at step 206 it is determined that data is not to be entered, the program branches to step 207 and determines whether the INVENTORY sub-routine has been selected. If at step 207 it is determined that the INVENTORY sub-routine has not been selected, the program branches to the end of the operating program at step 208.

If at step 207 it is determined that the INVENTORY sub-routine has been selected, the program branches to step 270 for initiating the start of the INVENTORY sub-routine. The INVENTORY sub-routine is initiated upon the entry of user-initiated inputs to the keyboard 30 as determined by the controller 24 under the control of the INVENTORY sub-routine at step 271. Following initial entry of inputs on the keyboard at step 271, the INVENTORY sub-routine then proceeds through a series of steps for determining what inventory commands have been input by a system user or operator. In sequencing through these steps, if it is determined that user inputs corresponding to one of these steps have been provided to the controller 24, the operating program branches back to step 271 and awaits entry of additional user-initiated input information relating to the designated step. For example, if at step 272 it is determined that the user would like to initialize a file, the program branches back to step 271 and awaits file initialization data to be input via keyboard 30. Similarly, if it is determined at step 273 that the user would like to create a new entry, the program returns to step 271 and awaits the input of the designation of the new entry. If it is determined at step 274 that the user desires to display the inventory for a given part number, the program returns to step 271 and awaits entry of the part number for which the inventory is desired to be displayed. If at steps 275 and 276 it is respectively desired to add or subtract from the number of a given part number in stock, the program branches back to step 271 and awaits entry of either the number to be added or the number to be subtracted from the number of parts having a given part number which is currently stored in the controller 24. Finally, if at step 277 it is determined the user has provided an input to the controller 24 requesting the listing of the current inventory for a given part number, the program returns to step 271 awaiting entry of the part number for which the current inventory is desired whereupon this number is read from the controller's RAM 27 and provided from the controller 24 to the video display 28 for presentation thereon.

There has thus been shown a system and method for automatically storing bar coded elements in locked storage bins such as drawers in a cabinet and for automatically retrieving these elements when desired under the control of a microcomputer wherein the possibility of erroneous storage and retrieval of these elements is substantially eliminated. The present invention automatically opens a drawer associated with a given bar code read from the element to be stored and prevents the opening of any other drawer until the drawer associated with that element has been closed. The bar code may be provided on an element handling and processing mechanism and read therefrom for opening and providing access to a drawer containing only those elements associated with that particular mechanism. In this manner erroneous or inadvertent storage and retrieval of the elements within the various drawers or containers is prevented.

While particular embodiments of the present invention have been shown and described, it will be obvious to those skilled in the art that changes and modifications may be made without departing from the invention in its broader aspects. For example, while the present invention has been described primarily in terms of the storage and retrieval of electronic component-bearing containers such as bags, it is not limited to this environment but has application to the storage and retrieval of virtually any bar coded elements. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

We claim:

1. A system for storing and retrieving a plurality of elements, wherein each of said elements has associated therewith a unique identifying bar code thereon and an associated drawer in a cabinet within which the element is stored and from which the element is retrieved, said system comprising:
   detection means responsive to the unique identifying bar code on an element for generating an address signal representing the unique identifying bar code and the drawer associated therewith;
   control means having a plurality of addressable locations therein, wherein said control means is coupled to said detection means and is responsive to an address signal output therefrom for accessing one of said addressable locations and for generating a drawer control signal representing one of said drawers in the cabinet:
   circuit means coupled to said drawers and to said control means and responsive to a respective drawer control signal for generating a release signal in response thereto;
   biasing means coupling each of said drawers to the cabinet for urging a drawer to an open position; and
   a plurality of latch means mounted to the cabinet, wherein each of said latch means is coupled to a respective drawer as well as to said circuit means and is responsive to a release signal output therefrom for releasing and allowing a drawer associated with said element to open under the influence of an associated biasing means.

2. The system of claim 1 wherein said detection means includes the combination of a bar code scanner and a bar code reader.

3. The system of claim 2 wherein said detection means further includes a laser scanning beam transmitter and receiver coupled to said bar code scanner for directing a laser beam upon the bar code of an element and for receiving that portion of the laser beam reflected back by the bar code.

4. The system of claim 1 further including user responsive input means coupled to said control means for providing a drawer control signal to said circuit means for opening a drawer associated with said drawer control signal in testing the operation of said drawer.

5. The system of claim 4 further including printer means coupled to said control means and responsive to said drawer control signal provided by said user responsive input means for printing a bar code label associated with said drawer and an element to be stored therein.

6. The system of claim 1 wherein said circuit means includes address comparator means for storing a plurality of coded addresses each associated with a respective one of said drawers and for comparing said stored coded addresses with an address signal from said control means for generating a drawer control signal when said stored coded address and said address signal match.

7. The system of claim 1 further including feedback means coupling said latch means and said control means for providing a drawer status signal thereto.

8. The system of claim 7 wherein said control means includes inhibit means responsive to a drawer status signal indicating that a first drawer is open for preventing the opening of a second drawer until the first drawer is closed.

9. The system of claim 7 including a plurality of cabinets each having a plurality of drawers therein and further including manually selectable cabinet indication means coupled to said feedback means for indicating in which cabinet a drawer is open.

10. The system of claim 9 wherein said manually selectable cabinet indication means includes a multi-element dip switch wherein each element thereof represents a given cabinet.

11. The system of claim 1 wherein said biasing means includes a plurality of springs each positioned between a respective drawer and the cabinet for urging a drawer to an open position.

12. The system of claim 1 wherein each latch means includes a solenoid mounted to the cabinet and engaging a respective drawer wherein said solenoid disengages said drawer in response to receipt of a release signal from said circuit means.

13. The system of claim 1 further including element receiving means having a bar code thereon associated with a given element for accessing a drawer in which said given element is stored whereupon said element may be deposited in said element receiving means for processing therein.

14. A method of storing and retrieving a plurality of elements in an associated locked drawer in a cabinet having a plurality of drawers wherein each of said elements has thereon a unique identifying bar code, said method comprising:
   reading the bar code on an element;
   unlocking a drawer associated with said element in response to the reading of the bar code;
   automatically opening the thus unlocked drawer in allowing for said element to be deposited in said drawer or to be removed therefrom;
   inhibiting the opening of all other drawers except the drawer associated with said element until that drawer is closed; and
   manually closing said drawer following the deposit of said element therein or its removal therefrom.

15. The method of claim 14 wherein the step of reading the bar code includes irradiating the bar code with a laser beam and detecting the laser beam reflected therefrom.

16. The method of claim 14 further including the steps of entering a bar code and printing a label containing said entered bar code.

17. The method of claim 14 wherein the step of inhibiting the opening of all other drawers except that drawer associated with said element further includes the steps of detecting an open drawer and preventing the opening of any other drawer until the open drawer is closed.

18. The method of claim 14 further including the step of generating additional bar codes corresponding to additional elements to be stored in said drawers.

19. The method of claim 14 further including the step of displaying the number of elements stored within each of said drawers.

20. The method of claim 14 further including the steps of reading a bar code on element receiving apparatus associated with one of said elements for opening a drawer associated with said element, removing said one of said elements from the drawer associated therewith, and depositing said one of said elements in said element receiving apparatus.

\* \* \* \* \*